United States Patent [19]
Hatch

[11] 3,765,737
[45] Oct. 16, 1973

[54] WHEEL BEARING SAFETY WASHER

[76] Inventor: Roosevelt L. Hatch, 1553 Alder Street, Norfolk, Va. 23502

[22] Filed: Nov. 19, 1971

[21] Appl. No.: 200,464

[52] U.S. Cl. .............................................. 308/211
[51] Int. Cl. .......................................... F16c 33/00
[58] Field of Search .................... 308/211, 210, 190, 308/191

[56] References Cited
UNITED STATES PATENTS
1,652,214   12/1927   Putnam .............................. 308/211

*Primary Examiner*—Charles J. Myhre
*Assistant Examiner*—Frank Susko
*Attorney*—Harvey B. Jacobson

[57] ABSTRACT

A guard, more particularly, a safety washer for use in conjunction with the outer anti-friction bearing assembly of a front wheel construction currently in use by manufacturers of motor vehicles, for example, by General Motors and other automobile manufacturers. This unique washer is made of heavy duty metal, can be readily lined up with and slid inwardly over the usual spindle and capped over and retentively held in its functioning position on the inner ring-type race of the bearing assembly. The outer marginal edge of the washer is provided with a push-fitted positioning and retaining flange. This outstanding flange constitutes an abutment which functions to keep the bearing assembly, particularly the inner race and roller-equipped cage, in a captive locale. Accordingly, displacement of the wheel should the cage fracture, is reduced to a practical minimum.

6 Claims, 4 Drawing Figures

Patented Oct. 16, 1973 3,765,737
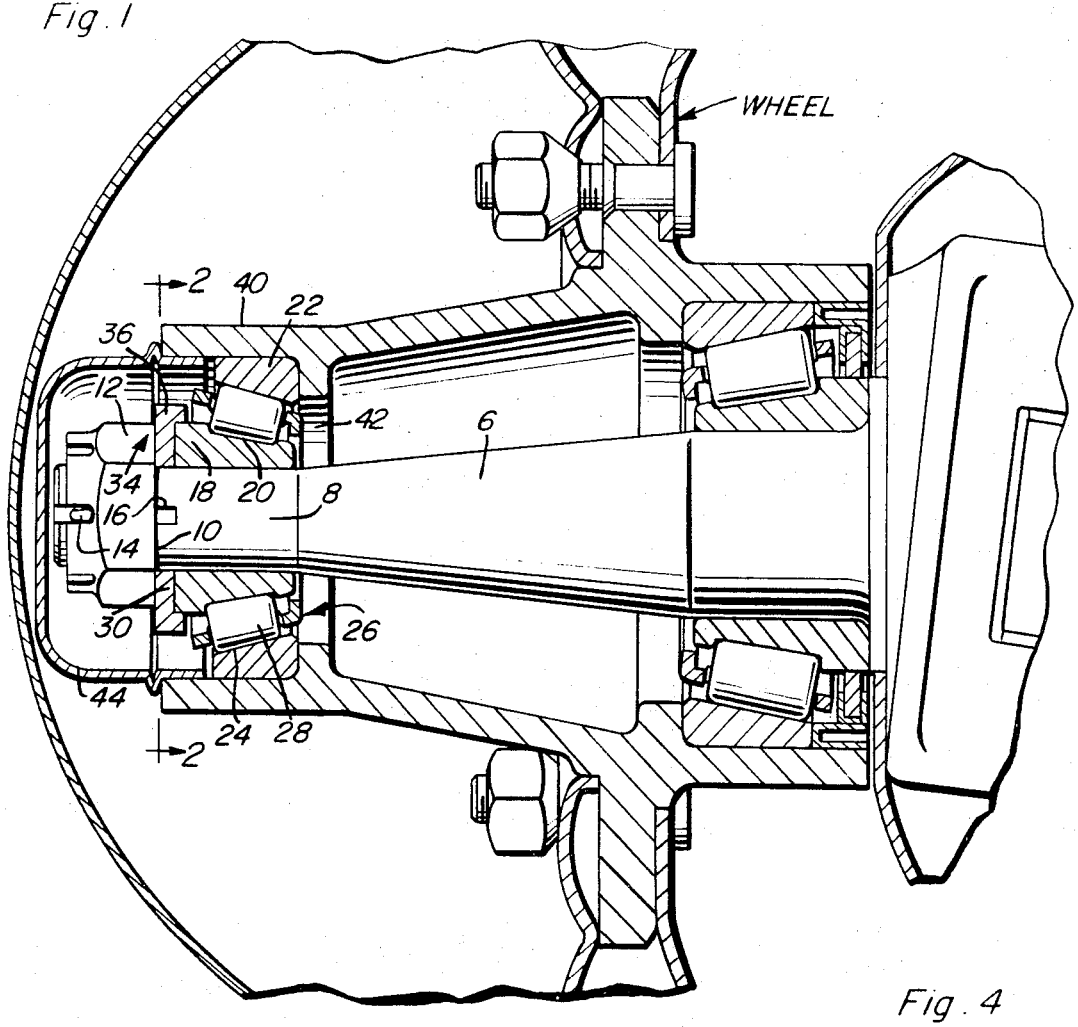
Fig. 1
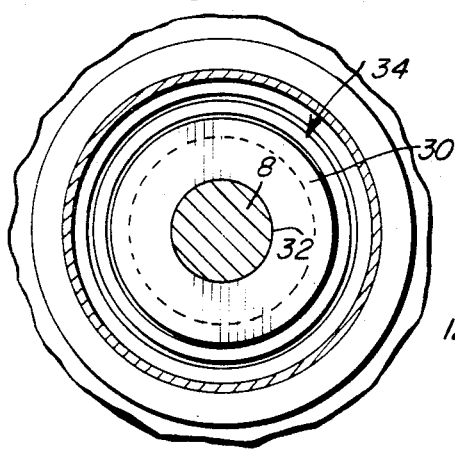
Fig. 2
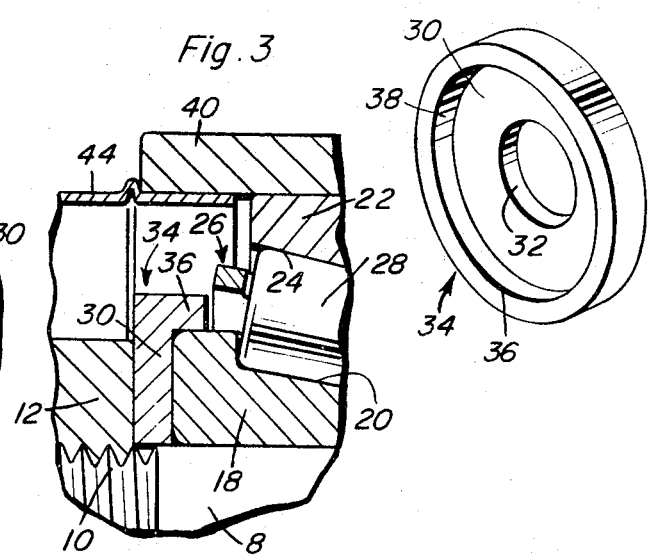
Fig. 3
Fig. 4

WHEEL BEARING SAFETY WASHER

The present invention relates to certain new and useful improvements in front wheel bearings, more particularly, the outward bearing assembly of the front wheel construction currently being used by manufacturers of motor vehicles, automobiles and trucks for example, and pertains, more explicitly stated, to a structurally and functionally novel guard-type washer which surrounds the usual spindle and is effectually maintained in a captive state between the usual clamping nut and inner race or ring of the enclosed bearing assembly.

The bearing assembly is typical, generally speaking, of the type of construction presently used by manufacturers, more particularly the adaptation wherein circumferentially spaced roller bearings are mounted for free rotation in a cage provided therefor and which is interposed between the oriented raceway surfaces between the inner and outer rings or races. Experience has shown that if and when the roller cage is fractured, broken or rendered non-functional, one or more of the rollers fall out of position, impinge against the tongue-equipped washer and castellated retaining nut and cotter pin. If and when the cage breaks, as is often the case, one or more of the rollers can be forcibly ejected from the raceway with the result that the hub of the wheel will override the washer and retaining nut and permit the entire wheel to free itself and dangerously fly off the spindle. It follows that with a view toward coping with this problem and minimizing the likelihood of accident, an improved safety-type washer has been devised to retain the wheel temporarily in place so that the driver of the vehicle will be alerted and enabled, in many instances, to take the necessary steps to drive the vehicle off the traversed portion of the highway or road.

Persons conversant with the field of endeavor under consideration are aware that it is common practice to interpose a washer between the bearing assembly and the assembling and clamping nut on the outer threaded stud or end of the spindle. In fact, it is common to use a washer which has an integral tongue or tang fitting into a keyway or groove in the surface of the end portion of the spindle. Despite the adaptations which are known and in common use, the problem of preventing accidental wheel displacement still exists. By providing the outer marginal edge of a heavy-duty washer with practical guard means, an abutment is provided and the bearing assembly, for the most part, is maintained in a safe and captive state should the aforementioned roller bearing cage be fractured and broken.

A survey of the prior art could perhaps bring to light certain but limited background information. Although a number of prior patents could be cited for background purposes, it is believed that it will suffice to mention a patent issued to C. A. Heinzelman which has to do with a roller bearing U.S. Pat. No. 1,030,401, and a second but less significant patent to Miller S. Tyson, U.S. Pat. No. 2,015,206, pertaining to an anti-friction bearing unit.

The herein disclosed concept has to do with both the combination and subcombination aspects of the invention. However, the essence of the invention pertains, as will be hereinafter clarified, to a front wheel anti-friction bearing assembly characterized by an inner ring-type race which is adapted to be push-fitted over a front wheel spindle, said inner race having an outer conical peripheral surface surrounded by an endless channel providing a first raceway. This first raceway is surrounded by an outer or second race which has an uninterruptedly smooth inner conical peripheral surface which constitutes a second raceway. These raceways are complemental to each other and the second raceway spans and is spaced from the first raceway. A circumferentially apertured anti-friction roller cage is interposed in the space between the races and raceways and is provided with a plurality of free turning roller bearings, that is, idling roller bearings which are oriented and coordinated with the respectively cooperable raceways. The attachable and detachable safety guard carried by the inner race is designed and adapted to keep the bearing assembly, particularly the inner race, in a captive position on the front wheel spindle.

Then, too, and as will be hereinafter more clearly understood, the safety washer is so constructed and designed that it snaps in a cap-like manner over the coacting outer peripheral surface of the inner race. The hole through the washer proper is identical in size to the bore of the bearing cone. The safety washer is made of heavy duty extermely hard metal designed with such fine tolerances that it will snap into place over the surface of the inner race. It is capable of being easily removed merely by inserting a screwdriver under its edge between the safety washer and cage of the bearing, twisting the screwdriver and then prying the washer free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view partly in section and partly in elevation showing a vehicle wheel, hub structure, axle and more particularly the outer bearing assembly to the left, the associated nut and spindle and the safety-type washer interposed and performing its intended function.

FIG. 2 is a section taken on the plane of the section line 2—2 in FIG. 1 looking in the direction of the arrows.

FIG. 3 is an enlarged detail view emphasizing the construction and arrangement of the improved nut-held safety washer and showing how it cooperates with the component parts of the roller bearing assembly.

FIG. 4 is a view in perspective of the safety washer by itself.

With reference now to the views of the drawing, the aforementioned automobile or vehicle axle is denoted by the numeral 6, the outer cylindrical end portion being reduced as at 8 and constituting the aforementioned spindle. The extreme outer end portion of the spindle is screw-threaded as at 10 to accommodate a castellated or an equivalent assembling and retaining nut 12 partly held in place by an associated cotter pin or key 14. In actual practice, a peripheral surface of the spindle is provided with a kerf or groove as at 16 which functions to accommodate a tongue or tang on the customarily used washer (not shown). The bearing assembly comprises an inner ring-type race 18 having an outer conical peripheral surface encompassed or surrounded by an endless channel providing a first raceway 20. The companion or complemental outer ring or race is denoted at 22 and it has an inner race embodying an uninterruptedly smooth inner conical peripheral surface which constitutes a second raceway 24 and is complemental to and spans and is spaced from the first raceway 20. The customary one piece circumferentially slotted or apertured cage is denoted at 26 and the apertured portions are provided with tapered roller bearings 28. Thus, it will be seen that the over-all anti-friction bearing assembly is of substantially conventional construction. However, and as before pointed out, the cage 26 is susceptible of breakage under certain adverse stress and strain driving conditions with the result that the washer (not shown) which is ordinarily used in this arrangement, does not prevent dislocation of the roller bearings. The attachable and detachable safety guard 34 is carried by the inner race and is designed and adapted to keep the bearing assembly, particularly the inner race, in a captive position on the front wheel spindle 8. To the ends desired, the washer proper is denoted by the numeral 30 and has a central precision opening 32 therein which is fitted with requisite nicety over the spindle 8, as brought out particularly well in FIG. 1. The over-all improved washer as a unit is denoted by the numeral 34. The outer marginal or peripheral surface of the washer 30 is provided with a lateral endless or annular flange, that is a stout or heavy-duty flange whose inner peripheral surface achieves the desired friction capping and retaining result. The flange is denoted at 36 and the inner peripheral surface at 38.

In the assembly shown in FIG. 1, the hub portion of the housing is denoted at 40, the shoulder rib at 42 and the attachable and detachable grease cap at 44.

The precise construction of the improved safety-type flanged washer is shown in FIG. 4. It is disclosed in its complete ready-to-use position in FIG. 1. FIG. 3 brings out the exact purpose and construction of the washer sandwiched or interposed between the nut and the coacting surface of the inner race 18. More particularly, the capping and retaining flange fitting over the outer peripheral surface of the inner race is brought out in FIG. 3 and it will be noted in this connection that it is properly spaced from the roller bearing cage 26.

A studied consideration of the views of the drawing in conjunction with the specification will enable the reader to obtain a clear and comprehensive understanding of the invention and features and advantages thereof. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a front wheel axle having a reduced outer end portion providing a spindle and terminating in an externally screw-threaded nut accommodating stud, a front wheel anti-friction bearing assembly removably mounted on said spindle, said assembly comprising an inner race surrounding and mounted on said spindle, said inner race having an outer conical peripheral surface encompassed by an endless channel providing a raceway, an outer race surrounding and concentric to said inner race and having an inner peripheral conical raceway spaced from and cooperatively oriented with said outer conical surface and first-named raceway, a cage interposed in the space between said raceways, said cage being provided with anti-friction bearings having cooperatively mating contact with the respectively surrounding raceways, a positioning and clamping nut screwed on said stud, and insertable and removable safety-type means surrounding said spindle, retentively interposed between said nut and inner race, and embodying a guard encompassing the outer peripheral surface of said inner race, whereby to guard against displacement of said bearings should the holding cage therefor break and lose its capability of retaining said bearings in place.

2. The combination defined in and according to claim 1, and wherein said guard comprises a heavy duty accurately fitted precision-made washer of a diameter that the outer peripheral edge projects outwardly beyond the outer peripheral surface of said inner race in a manner to block accidental ejection of said inner race or said encaged bearings.

3. The combination defined in and according to claim 1, and wherein said guard comprises a heavy duty accurately fitted precision-made washer of a diameter that the outer peripheral edge projects outwardly beyond the outer peripheral surface of said inner race in a manner to block accidental ejection of said inner race or said encaged bearings, said outer projecting peripheral edge being provided with rigid abutment means.

4. The combination defined in and according to claim 3, and wherein said abutment means comprises an annular flange which is lateral to an inward face of said washer, said flange being retentively friction-fitted and capped over a coacting portion of said inner race.

5. The combination defined in and according to claim 3, and wherein said abutment means comprises an annular flange which is lateral to an inward face of said washer, said flange being retentively friction-fitted and capped over a coacting portion of said inner race, said flange being of a prescribed cross-sectional dimension that while providing a potential blocking abutment, it is nevertheless spaced from and normally out of contact with said cage.

6. A front wheel anti-friction bearing assembly comprising, in combination, an inner race adapted to be push-fitted over a front wheel spindle, said inner race having an outer conical peripheral surface surrounded by an endless channel providing a first raceway, an outer race surrounding and concentric to said inner race and having an uninterruptedly smooth inner conical peripheral surface constituting a second raceway complemental to and spanning and spaced from said first raceway, a circumferentially apertured anti-friction roller cage interposed in the space between said races and raceways and provided with a plurality of free turning roller bearings oriented and coordinating with the respectively cooperable raceways, and an attachable and detachable safety guard designed and adapted to keep said bearing assembly, particularly said inner race, in a captive position on said front wheel spindle, said guard comprising a heavy-duty accurately fitted precision-made washer of a diameter that the outer peripheral edge projects outwardly beyond the outer peripheral surface of said inner race, said outer projecting peripheral edge being provided with rigid abutment means comprising an annular flange which is lateral to an inner face of said washer, said flange being retentively friction-fitted and capped over a coacting portion of said inner race, said flange being of increased cross-sectional dimension and providing a blocking abutment, being nevertheless spaced from and normally out of contact with the associated cage.

* * * * *